Oct. 30, 1962 M. GARBUNY ETAL 3,061,726
COLOR SENSITIVE INFRARED DETECTOR
Filed June 10, 1958

WITNESSES:
Robert A. Gerlach
Bernard R. Gieguey

INVENTORS
Max Garbuny and
Thomas P. Vogl.
BY James O. Blair
ATTORNEY

United States Patent Office 3,061,726
Patented Oct. 30, 1962

3,061,726
COLOR SENSITIVE INFRARED DETECTOR
Max Garbuny and Thomas P. Vogl, Penn Township, Allegheny County, Pa., assignors to Westinghouse Electric Corporation, East Pittsburgh, Pa., a corporation of Pennsylvania
Filed June 10, 1958, Ser. No. 742,463
20 Claims. (Cl. 250—83.3)

This invention relates to an infrared detector and, more particularly, to an infrared color detector capable of distinguishing between different wavelength regions of the infrared portion of the spectrum.

The word "color" as used in this application refers to the effect on a detector of different wavelengths in the infrared region of the spectrum in a manner similar to the usual use of the word with reference to the visible portion of the spectrum. Prior art infrared detectors indicate the total amount of radiation received to which the detector is sensitive, i.e., the integral of all wavelengths emitted by the source capable of exciting the detector. It is therefore impossible to determine whether a source of infrared radiation is (1) at a low temperature but very close to the detector, (2) at a low temperature having a large emitting surface, (3) very hot at a great distance from the detector, and (4) very hot having a small emitting surface, since the total amount of radiation received by the detector in each case could be substantially the same assuming the absence of an optical system.

The equation for the radiation received by a detector within a wavelength interval $d\lambda$ from a point source of radiation is shown as follows:

$$E(\lambda)d\lambda = C_1 \frac{AE(\lambda)d\lambda}{R^2}[\lambda^{-5}(eC_2/\lambda T - 1)^{-1}]$$

where $A$ = the area of the radiation surface
$R$ = the distance of the source of radiation
$C_2, C_1$ = constants
$E(\lambda)$ = the emissivity of the object at
$T$ = the temperature of the source
$\lambda$ = the wavelength of the radiation
$d\lambda$ = the interval of wavelengths considered.

The statement in brackets on the right side of the equation states Planck's law of energy distribution over various wavelengths for various temperatures. From this law the Stefan-Boltzmann law may be obtained which states that the total energy radiated increases with the fourth power of the absolute temperature. Also from Planck's law it can be shown that the maximum of the energy distribution i.e., the "color," shifts toward shorter wavelengths with increasing temperature. Therefore, if an ordinary infrared detector, which is incapable of differentiating between radiation emitted at different temperatures, is used to seek out enemy planes or missiles it may indicate false signals due to radiation emitted by stars or clouds. Also it will not be able to distinguish between different types of radiation sources such as small, fast, guided missiles or large airplanes which may emit the same amount of total radiation.

In order to estimate the nature of a radiation source, it is necessary to determine the approximate temperature of the source. This can be done by differentiating and comparing parts of the received infrared spectrum. Since the maximum of the energy distribution shifts toward shorter wavelengths with an increase in the temperature of the source, an approximation of the temperature of the emitting source can be made by comparing wavelengths shorter than the selected cutoff, i.e., wavelengths shorter than two microns for example, with either the total radiation received or with wavelengths longer than the selected cutoff.

Heretofore, this has been accomplished by filtering the incident infrared radiation before it reaches the detector, thereby permitting only certain wavelengths of the infrared spectrum to impinge on the detector. Either two detectors, each with its own filter, or a single detector having a mechanical means of selectively positioning two or more filters in the path of the incident infrared radiation have been used. Where two detectors are employed they must be exactly matched to each other, otherwise spurious conclusions will be drawn upon comparing the output of the two detectors. These methods are cumbersome, expensive and unsatisfactory.

It is therefore an object of our invention to provide an improved infrared detector.

Another object is to provide an improved infrared detector which differentiates between different wavelengths of the infrared spectrum.

A further object of our invention is to provide an improved infrared detector which indicates the approximate temperature of the source of infrared radiation.

An additional object of our invention is to provide an improved infrared detector utilizing the intrinsic and impurity photoconduction effects of semiconductors.

An auxiliary object of our invention is to provide an improved infrared detector which utilizes the effects of a magnetic field on the intrinsic photoconductivity of a semiconductor.

A still further object of our invention is to provide an improved infrared detector utilizing the rise and decay time constants of photoconduction in a semiconductor exhibiting intrinsic and impurity type photoconduction.

Still another object of our invention is to provide an improved infrared detector which makes use of the principle that the current due to intrinsic photoconduction is generated near the surface upon which infrared radiation impinges and the current due to impurity photoconduction is generated throughout the crystal.

A supplementary object of our invention is to provide an improved infrared detector which will differentiate between infrared radiation from bodies having different temperatures.

These and other objects of this invention will be apparent from the following description taken in accordance with the accompanying drawing, throughout which like reference characters indicate like parts, which drawing forms a part of this application and in which.

Figure 1:
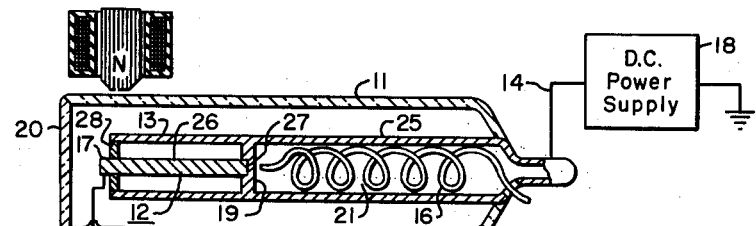
FIGURE 1 is a sectional view of an infrared color detector according to one embodiment of this invention schematically showing the electrical circuit associated therewith.

The principles upon which this invention operate may briefly be explained as follows. Photoconductive devices operate on the principle that, when electromagnetic radiation impinges on the photoconductor, carriers may be excited from states to which they are normally bound into states in which they are free to move in an electric field, thus increasing the electrical conductivity of the material. Certain semiconductors, such as germanium and silicon, are excellent photoconductors. When these materials are doped with appropriate impurities such as gold, copper, zinc, platinum and manganese, carriers will be produced by two mechanisms. One is known as intrinsic photoconductivity. In order for a material to exhibit intrinsic photoconductivity, the radiation that impinges on the material must have energy sufficient to raise an electron from the valence band to the conduction band. The other mechanism is known as impurity photoconduction. For carriers to be produced by this mechanism, the impinging radiation must have an energy sufficient to raise an electron from an impurity level somewhere within the forbidden gap to the conduction band or raise an electron from the valence band to an impurity level of the acceptor type, leaving a hole in the valence band free to move by "hole conduction." The above mentioned impurities will provide such impurity levels within the forbidden gap. Since these impurity levels will lie closer to either the conduction or the valence band than the distance from the valence to the conduction band, the energy required to raise an electron from an impurity level to the conduction band or from the valence band to an impurity level of the acceptor type is not as great as the energy required to raise an electron from the valence band to the conduction band. Therefore since energy is inversely proportional to wavelength, wavelengths longer than the threshold for intrinsic photoconduction which is approximately two microns for germanium will produce impurity photoconductivity but will not produce intrinsic photoconductivity since they may not have sufficient energy to raise electrons from the valence to the conduction band. It should be noted that the semiconductor material must be maintained at a very low temperature in order to insure that the photoconductivity of the material is due to carriers produced by electromagnetic radiation and not thermal excitation.

The coefficient of absorption in materials such as silicon and germanium is very high for wavelengths shorter than the threshold for intrinsic photoconduction, therefore all of the photoconductivity due to the intrinsic properties of the material is confined to a shallow layer near the impinging surface of the material. However, these same materials have a very low coefficient of absorption to wavelengths longer than the threshold for intrinsic photoconduction and therefore impurity photoconductivity may occur throughout the material. A more detailed discussion of the intrinsic and impurity properties of silicon and germanium can be found in "Photoconductivity Conference," Part IV-A entitled "Optical and Photoconductive Properties of Silicon and Germanium" by E. Burstein, G. Picus and N. Sclar, published by John Wiley & Sons, Inc.

A relatively large amount of infrared radiation having a wavelength below approximately two microns indicates that the radiating source is relatively hot. Two microns is the approximate theshold for intrinsic photoconductivity in germanium. Therefore by differentiating between different wavelengths of infrared radiation, for example, above and below two microns, the intrinsic photoconductivity may be distinguished from the impurity photoconductivity. By comparing the photocurrent due to one type with the other or by comparing the photocurrent of one type with the total photocurrent, the portion of photocurrent due to intrinsic photoconductivity may be determined, therefore an approximation of the temperature of a source can be made and its threat as an enemy weapon determined.

When a magnetic field is impressed perpendicular to the longitudinal axis of an impurity doped semiconductor the response due to intrinsic photoconductivity is greatly reduced, while the response due to impurity photoconductivity is unaffected. The ratio of the photocurrent with a magnetic field to the photocurrent without a magnetic field is directly proportional to the ratio of the amount of infrared radiation having wavelengths longer than the threshold for intrinsic photoconduction impinging on the detector to the total amount of radiation within the infrared region of the spectrum impinging on the detector. The infrared region of the spectrum is defined as electromagnetic radiation having wavelengths between the limits of 0.76 micron and 300 microns.

FIG. 1 shows infrared detector 10 including an impurity doped semiconducting target member 12 having a face portion 17 and a body portion 26, which includes a rear portion 27. The target member 12 as shown is a rectangular solid. The target member 12 is disposed within an evacuated envelope comprising a main body portion 11, an infrared transmitting window 20 of a suitable material such as silver chloride or barium fluoride closing off one end of said main body portion and an envelope recess portion 21 closing off the other end of said main body portion. The recess portion 21 has a wall 25 and a base 19 both of which may be made of a suitable material which is both a good thermal and good electrical conductor such as stainless steel. The base 19 of the recess portion 21 is in intimate contact with the rear portion 27 of the target member 12. A metallic member 13, which is a portion of the wall 25 of the recess portion 21 which extends into the region within the evacuated envelope 11, substantially surrounds the target member 12. The forward portion of the target member is supported within the metallic member 13 by a suitable insert 28 which should be of a material which is an electrical insulator and thermal conductor, such as sapphire. Disposed within the recess portion 21 is a helical coil 16 which transports a liquid coolant such as liquid nitrogen, liquid hydrogen or liquid helium from a suitable container to the base portion 19 thereby cooling the target member 12 to the temperature required to prevent thermal excitation of carriers within the target member 12. This is only one of many possible mounting schemes.

A suitable direct current potential such as from a power supply 18, is applied across the target member 12 by means of conductors 14 and 15 which are electrically connected to opposite ends of the target member 12. The target member 12 may be a single crystal of germanium or silicon doped with appropriate impurities such as gold, zinc, copper, platinum, manganese, etc., which may be chosen on the basis of suitable energy gap, partition constant, etc. A suitable method of growing impurity doped semiconductive single crystals, is described in an article entitled "Gold as an Acceptor in Germanium" by W. C. Dunlap, Jr., published in "Physical Review," vol. 97, No. 3, February 1, 1955, pages 614–629.

Although an evacuated envelope is shown in FIG. 1, any means which will provide a moisture free environment free of foreign particles such as a gas filled envelope or a structure obtained by encapsulating the target member in an infrared transmissive resin, may be used. It may also be advantageous to provide a filtering means that will permit only infrared radiation to reach the target member.

In the operation of this device infrared radiation will pass through the infrared transmissive window 20 and impinge on the face portion 17 of the target member 12 thereby increasing the conductivity of the target member 12 as discussed above. A current will flow through the target member 12 to the amplifier 22 and thence to one gun of a multi-gun color television tube 23. This gun may be positioned in such a manner that it will display only one color, say red, which is representative of the total amount of radiation reaching the target member 12. To differentiate between intrinsic and impurity photoconduction, a magnetic coil 24 may be positioned around the envelope 11 of the detector 10 so that the magnetic field of the coil 24 is perpendicular to the longitudinal axis of the target member 12. When the magnet 24 is energized, the photocurrent due to the intrinsic properties of the target member 12 will be reduced as discussed previously. This current, which represents the photocurrent due only to the impurity properties of target member 12, is amplified and applied to a second gun of the color television tube 23 which gun is positioned so that it will display another color (blue, for example) on face of the tube 23. By comparing the intensity of the two signals, an approximation of the temperature of the source of radiation can be made. For example, the magnetic field may be energized during the scanning time of one period of the color television tube during which time only the blue gun operates. During the next period the magnetic field is not energized and only the red gun operates. Thus, a continuous visual comparison of the total photocurrent with the photocurrent due to impurities may be obtained on the screen of the television tube.

The embodiment shown in FIG. 1 is not limited to the comparing means shown but other suitable means may be employed. Furthermore, the means shown is not limited to a two-gun cathode ray tube having red and blue phosphors since it may be desirable to show the total photoconductivity, the intrinsic photoconductivity and the impurity photoconductivity on the same screen.

Figure 2:
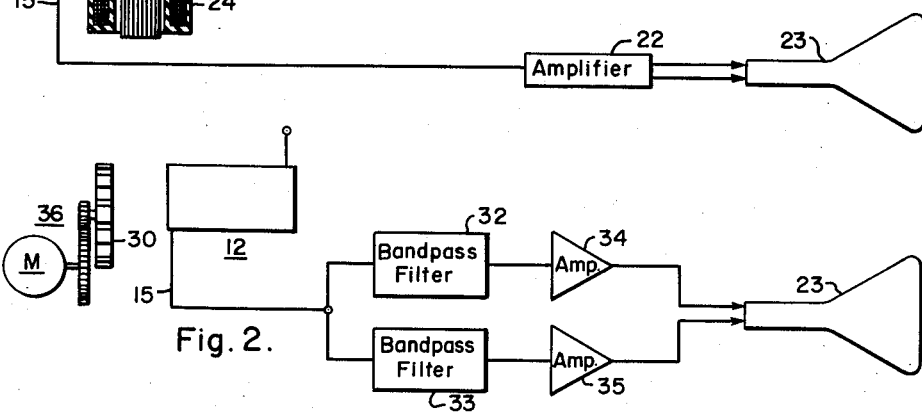
FIG. 2 is a schematic view of another embodiment of this invention including a chopping wheel.
Figure 3:
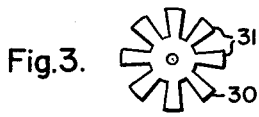
FIG. 3 is a front view of the chopping wheel shown in FIG. 2.

It has been observed that the rise and decay time constants of the photocurrent due to intrinsic response is on the order of approximately ten microseconds while the rise and decay time constants of the photocurrent due to the impurity response is on the order of one-tenth microsecond. FIG. 2 shows another form of this invention which makes use of this knowledge to differentiate between intrinsic and impurity photoconduction. The details of the infrared detector 10, shown in FIG. 1, are omitted for purposes of simplicity only. Incident infrared radiation is chopped by means of wheel 30 which has teeth 31 as shown in FIG. 3, to permit the periodic transmission of infrared radiation to target member 12. The wheel 30 may be rotated at a suitable angular speed by a driving means 36. The spacing of the teeth 31 and angular velocity of the wheel 30 are such that the pulse width of the transmitted radiation and the time period of interruption are on the order of the longer time constants, i.e., ten microseconds. The photocurrent produced by the incident radiation on face portion 17 of the target member 12 may be fed to a pair of bandpass filters 32 and 33 arranged in parallel. Bandpass filter 32 will pass only pulses having a rise time on the order of ten microseconds and bandpass filter 33 will pass pulses having a rise time on the order of one-tenth microsecond. The values of bandpass filters 32 and 33 are approximately 100 kilocycles and one megacycle, respectively. The outputs of the bandpass filters 32 and 33 can be compared by a means similar to that described for FIG. 1, that is by passing each signal through amplifiers 34 and 35 and applying each amplified signal to a different gun of color television tube 23. Other comparing means such as direct reading of the pulses or storage of the signals in a computer also may be employed in this embodiment as well as in the other embodiments shown.

Figure 4:
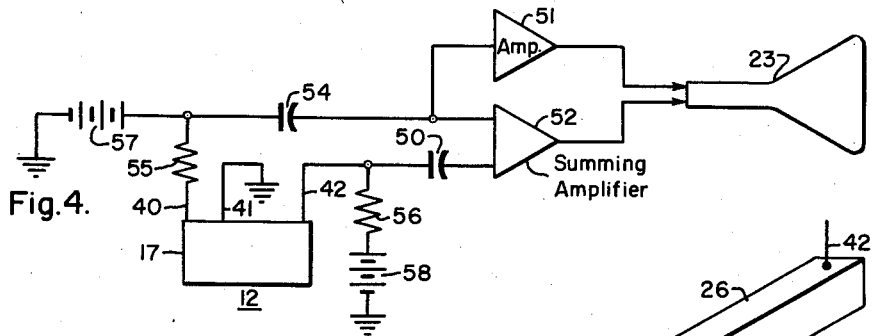
FIG. 4 is a schematic view of another embodiment of this invention.
Figure 5:
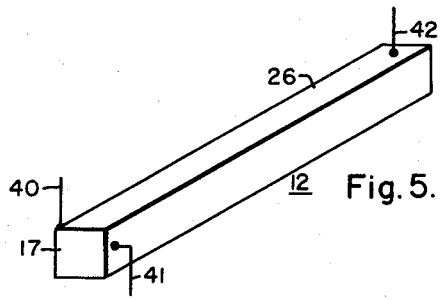
FIG. 5 is an enlarged perspective view of the target member as shown in FIG. 4.

As stated previously, intrinsic photoconductivity will occur in the semiconductor target near the face upon which the infrared radiation impinges because of the high coefficient of absorption of silicon and germanium for wavelengths having sufficient energy to produce intrinsic photoconduction. Also the impurity photoconduction will occur throughout the semiconductor because of its low coefficient of absorption. FIGS. 4 and 5 show a target member 12 having a face portion 17, a body portion 26 and three contact members 40, 41 and 42 disposed along the body portion 26 and forming non-rectifying electrical contacts with target member 12. Contact member 40 is located closely adjacent the face portion 17 upon which incident infrared radiation impinges. Conductor 42 is located near the other end of the body portion 26. Contact member 41 is located on body portion 26 between conductors 40 and 42. When suitable potentials such as from batteries 57 and 58 through load resistors 55 and 56 are applied to target member 12, when infrared radiation is incident on base portion 17, for example, if contact member 41 is grounded and contact members 40 and 42 are at suitable potentials different from ground, the signal between the contact members 40 and 41 will be proportional to the amount of radiation in the intrinsic region, and the signal between contact members 41 and 42 will be proportional to the radiation in the impurity region. These signals can then be amplified and either added, substracted or any other operation performed on it as is known in the art. The potential of batteries 57 and 58 is on the order of 100 volts. In FIG. 4, for example, the signals are alternating current coupled by means of capacitors 50 and 54. The intrinsic signal from contact member 40 is amplified by amplifier 51 and displayed as before. In the summing amplifier 52 the signals from contact members 40 and 42 are added and the total radiation signal received displayed as before.

A suitable embodiment of the target member 12 is shown in FIG. 5 in which the target member 12 may be about one centimeter in length and the cross section two millimeters by two millimeters. Contact member 40 is located closely adjacent the face portion 17. Contact member 42 may be located about one centimeter from contact member 40 and at the extreme opposite end of the target member 12. Contact member 41 may be located between contact members 40 and 42 at a distance of about one millimeter from contact member 40. To obtain maximum sensitivity of the detector, the potential difference across contact members 40 and 41 may be on the order of 20 volts while the potential difference across contact members 40 and 42 may be on the order of 100 volts.

While the present invention has been shown in only certain embodiments, it will be obvious to those skilled in the art that it is not so limited but is susceptible of various changes and modifications without departing from the spirit and scope thereof.

We claim as our invention:

1. An infrared detector including a target member disposed within an envelope, said target member comprising an impurity doped semiconducting material which exhibits intrinsic photoconductivity and impurity photoconductivity upon the incidence of infrared radiation, a cooling means for cooling said target and a differentiating means operating in conjunction with said target member to distinguish between said intrinsic photoconductivity and said impurity photoconductivity.

2. An infrared detector including a target member disposed within an envelope, said target member comprising an impurity doped semiconducting material which exhibits intrinsic photoconductivity and impurity photoconductivity upon the incidence of infrared radiation, a cooling means for cooling said target, a differentiating means operating in conjunction with said target member to distinguish between said intrinsic photoconductivity and said impurity photoconductivity and a comparing means to exhibit the portion of photoconductivity due to said intrinsic photoconductivity.

3. An infrared detector including a target member disposed within an envelope, said target member comprising an impurity doped semiconducting material which exhibits intrinsic photoconductivity and impurity photoconductivity upon the incidence of infrared radiation, a cooling means for cooling said target and a differentiating means operating in conjunction with said target member to distinguish between said intrinsic photoconductivity and said impurity photoconductivity, said differentiating means including a means for periodically impressing a magnetic field on, and perpendicular to the axis of, said target member.

4. An infrared detector including a target member disposed within an envelope, said target member comprising an impurity doped semiconducting material which exhibits intrinsic photoconductivity and impurity photoconductivity upon the incidence of infrared radiation, a cooling means for cooling said target, a differentiating means operating in conjunction with said target member to distinguish between said intrinsic photoconductivity and said impurity photoconductivity, said differentiating means including a means for periodically impressing a magnetic field on said target member and a comparing means to exhibit the ratio of photoconductivity produced without said magnetic field to the photoconductivity produced with said magnetic field.

5. An infrared detector including a target member disposed within an envelope, said target member comprising an impurity doped semiconducting material which exhibits intrinsic photoconductivity and impurity photoconductivity upon the incidence of infrared radiation, a cooling means for cooling said target and a differentiating means operating in conjunction with said target member to distinguish between said intrinsic photoconductivity and said impurity photoconductivity, said differentiating means including an interrupting means to periodically permit the transmisison of said incident infrared radiation to said target member.

6. An infrared detector including a target member having a face portion and a body portion disposed within an envelope, said target member comprising an impurity doped semiconducting material which exhibits intrinsic photoconductivity and impurity photoconductivity upon the incidence of infrared radiation, a cooling means for cooling said target and a differentiating means operating in conjunction with said target member to distinguish between said intrinsic photoconductivity and said impurity photoconductivity, said differentiating means including at least three contact members disposed along said body portion of said target member.

7. An infrared detector including a target member having a face portion and a body portion disposed within an envelope, said target member comprising an impurity doped semiconducting material which exhibits intrinsic photoconductivity and impurity photoconductivity upon the incidence of infrared radiation, a cooling means for cooling said target and a differentiating means operating in conjunction with said target member to distinguish between said intrinsic photoconductivity and said impurity photoconductivity, said differentiating means including at least three contact members disposed along said body portion of said target member and forming non-rectifying electrical connections therewith, the first contact member being located on said body portion closely adjacent to said face portion, the second contact member being located on said body portion and at the opposite end of said body portion from said first contact member and the third contact member being located between said first and second contact members.

8. An infrared detector including a target member disposed within an envelope, said target member comprising an impurity doped semiconducting material which exhibits intrinsic photoconductivity and impurity photoconductivity upon the incidence of infrared radiation, said semiconducting material being selected from the group consisting of germanium and silicon and said impurity being selected from the group consisting of gold, copper, zinc, platinum and manganese, a cooling means for cooling said target and a differentiating means operating in conjunction with said target member to distinguish between said intrinsic photoconductivity and said impurity photoconductivity.

9. An infrared detector including a target member having a face portion and a body portion disposed within an evacuated envelope, said target member comprising an impurity doped semiconducting material which exhibits intrinsic photoconductivity and impurity photoconductivity upon the incidence of infrared radiation, said semiconducting material being germanium and said impurity selected from the class consisting of gold, copper, zinc, platinum and manganese, a cooling means for cooling said target and a differentiating means operating in conjunction with said target member to distinguish between said intrinsic photoconductivity and said impurity photoconductivity, 10. An infrared detector comprising a target member having a face portion and a body portion disposed within an evacuated envelope, said target member including an impurity doped semiconducting material which exhibits intrinsic photoconductivity and impurity photoconductivity upon the incidence of infrared radiation, said semiconducting material being silicon and said impurity selected from the class consisting of gold, copper, zinc, platinum and manganese, a cooling means for cooling said target and a differentiating means operating in conjunction with said target member to distinguish between said intrinsic photoconductivity and said impurity photoconductivity.

11. A infrared detector comprising a target member, said target member being an impurity doped semiconductor which exhibits intrinsic photoconductivity and impurity photoconductivity upon the incidence of infrared radiation, and a means associated with said target member for deriving a first and a second electrical signal for determining said intrinsic photoconductivity and said impurity photoconductivity.

12. An infrared detector including a target member, said target member being an impurity doped semiconducting material that exhibits intrinsic photoconductivity and impurity photoconductivity upon the incidence of infrared radiation, said intrinsic photoconductivity having a rise time substantially longer than the rise time of said impurity photoconductivity, a means to periodically interrupt said infrared radiation, and a means associated with said target member for deriving a first electrical pulse representative of said intrinsic rise time and a second electrical pulse representative of said impurity rise time.

13. An infrared detector including a target member having a face portion, said target member being an impurity doped semiconducting material that exhibits intrinsic photoconductivity near said face portion of said target member upon which infrared radiation is incident, said impurity doped semiconducting material also exhibits impurity photoconductivity throughout said target member, and a means associated with said target member for deriving a first electrical signal representative of said intrinsic photoconductivity, and a second electrical signal representative of said impurity photoconductivity.

14. An infrared detector comprising a unitary member responsive to infrared radiation to give a first response to infrared radiation in a first wave length band and a second response to infrared radiation in a second wave length band and means operably associated with said member to derive output signals from said member wherein said first and second responses are distinguishable when said member is simultaneously irradiated with infrared radiation in both said first and second wave length bands.

15. An infrared detector comprising a unitary, impurity doped photoconductive member responsive to infrared radiation to give a first photoconductive response to infrared radiation in a first wave length band and a second photoconductive response to infrared radiation in a second wave length band and means operably associated with said photoconductive member to derive output signals from said member wherein said first and second photoconductive responses are distinguishable when said member is simultaneously irradiated with infrared radiation in both said first and second wave length bands.

16. An infrared detector comprising a photoconductive member responsive to infrared radiation to give an intrinsic photoconductive response to infrared radiation in a first wave length band and an impurity photoconductive respone to infrared radiation in a second wave length band and means operably associated with said member to derive output signals from said member wherein said intrinsic and said impurity photoconductive responses are distinguishable when said member is simultaneously irradiated with infrared radiation in both said first and second wave length bands.

17. An infrared detector comprising a photoconductive member responsive to infrared radiation to give an intrinsic photoconductive response to infrared radiation in a first wave length band and an impurity photoconductive response to infrared radiation in a second wave length band, conductive members attached to said semiconductor member to derive electrical signals in accordance with said photoconductive responses, magnetic field producing means to substantially suppress said intrinsic photoconductive response during a first time period so that the electrical output signal during said first time period is substantially caused only by said impurity photoconductive response.

18. An infrared detector comprising a semiconductor member responsive to infrared radiation to give an intrinsic photoconductive response to infrared radiation in a first wave length band and an impurity photoconductive response to infrared radiation in a second wave length band, conductive members attached to said semiconductor member to derive electrical output signals therefrom as caused by said photoconductive responses, means to chop incident infrared radiation into discrete pulses incident on said semiconductor member and circuit means to derive a first signal due to said intrinsic photoconductive response and the second signal due to said impurity photoconductive response in accordance with the difference in their rise or decay time characteristics.

19. An infrared detector comprising a semiconductive member responsive to infrared radiation to give an intrinsic photoconductive response to infrared radiation in a first wave length band and an impurity photoconductive response to infrared radiation in a second wave length band, said member having thereon a first pair of leads to derive an electrical output signal predominantly due to said intrinsic photoconductive response and a second pair of leads to derive an output signal predominantly caused by said impurity photoconductive response.

20. An infrared detector comprising a semiconductive member responsive to infrared radiation to give an intrinsic photoconductive response to infrared radiation in a first wave length band and an impurity photoconductive response to infrared radiation in the second wave length band, said member having thereon a first pair of leads to derive an electrical output signal due to said intrinsic photoconductive response and a second pair of leads having one lead in common with said first pair of leads to derive an output signal predominantly caused by said impurity photoconductive response, and circuit means to compare said first and second electrical signals.

References Cited in the file of this patent

UNITED STATES PATENTS

| | | |
|---|---|---|
| 2,547,173 | Rittner | Apr. 3, 1951 |
| 2,742,550 | Jeenness | Apr. 17, 1956 |
| 2,812,446 | Pearson | Nov. 5, 1957 |
| 2,816,232 | Burstein | Dec. 10, 1957 |
| 2,844,737 | Hahn et al. | July 22, 1958 |
| 2,848,626 | Brackman | Aug. 19, 1958 |
| 2,879,405 | Pankove | Mar. 24, 1959 |
| 2,920,205 | Choyke | Jan. 5, 1960 |
| 2,936,373 | Walker | May 10, 1960 |
| 2,953,688 | Maxwell | Sept. 20, 1960 |

OTHER REFERENCES

Germanium Photocells, by Dr. W. C. Dunlap, Jr., General Electric Review, March 1952, pp. 26–30.

Optical and Photoconductive Properties of Silicon and Germanium, by E. Burstein et al., Photoconductivity Conference, published by John Wiley & Sons, Inc., New York. Pages 353–413 relied on.

Gold as an Acceptor in Germanium, by W. C. Dunlap, Jr., Physical Review, vol. 97, No. 3, February 1, 1955, pages 614–629.